United States Patent [19]

Smith

[11] Patent Number: 5,838,961
[45] Date of Patent: Nov. 17, 1998

[54] METHOD OF OPERATION AND APPARATUS FOR OPTIMIZING EXECUTION OF SHORT INSTRUCTION BRANCHES

[75] Inventor: Alan G. Smith, San Ramon, Calif.

[73] Assignee: CPU Technology, Inc., Pleasanton, Calif.

[21] Appl. No.: 724,198

[22] Filed: Oct. 1, 1996

[51] Int. Cl.⁶ .................................................... G06F 9/38
[52] U.S. Cl. ........................................... 395/580; 395/581
[58] Field of Search .................................. 395/580, 581, 395/561, 568, 570, 383

[56] References Cited

U.S. PATENT DOCUMENTS

| | | | |
|---|---|---|---|
| 4,755,935 | 7/1988 | Davis et al. | 395/250 |
| 5,121,488 | 6/1992 | Ngai | 395/570 |
| 5,581,719 | 12/1996 | Steely, Jr. et al. | 395/383 |
| 5,590,296 | 12/1996 | Matsuo | 395/570 |
| 5,734,881 | 3/1998 | White et al. | 395/585 |

*Primary Examiner*—Parshotam S. Lall
*Assistant Examiner*—Viet Vu
*Attorney, Agent, or Firm*—Townsend and Townsend and Crew LLP

[57] ABSTRACT

A technique for speeding CPU operations in handling branch instructions in which the target instructions is a short displacement away from its branch instruction is disclosed. When the target instruction is displaced within a predetermined number of instructions away, a logic block and counter issue an invalidating control signal which invalidates the execution of the branch instruction and instructions between the branch instruction and the target instruction. The invalidating control signal is removed when the target instruction is reached. Time is saved if the latency of the computer system is longer than the time required to cycle the instruction queue to the target instruction.

10 Claims, 2 Drawing Sheets

| | | |
|---|---|---|
| A | CMP | R2,0 |
| B | JNE | LABEL |
| C | ADD | R3,1 |
| D | SUB | R4,2 |
| LABEL: | | |
| E | MOVE | R6,R7 |
| F | ... | |
| ... | | |
FIG. 1A
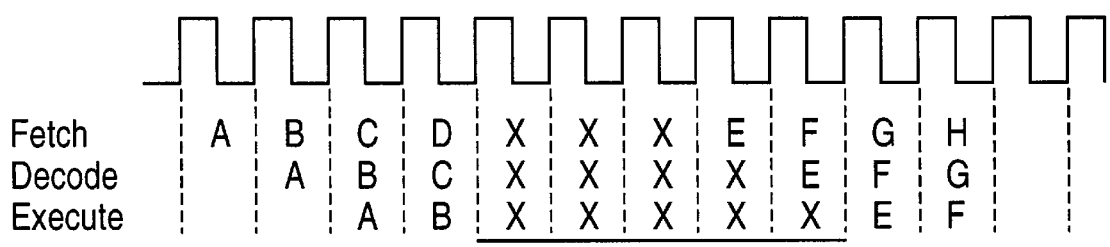
FIG. 1B (PRIOR ART)
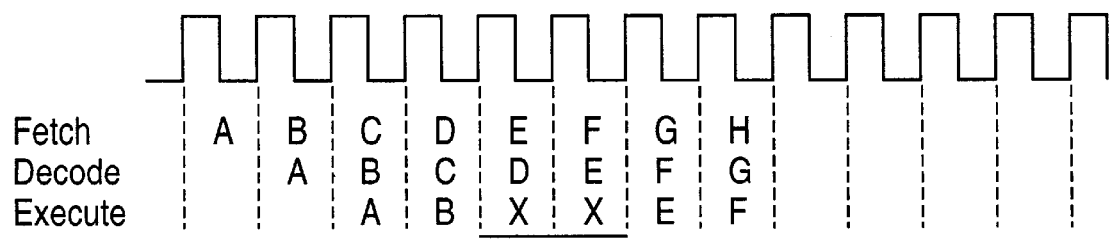
FIG. 2

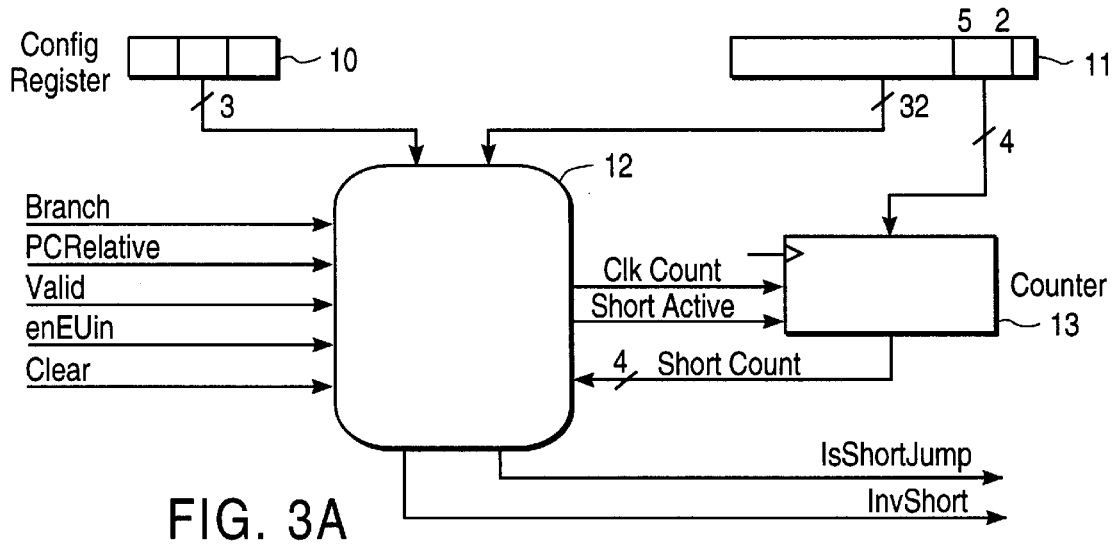

FIG. 3A

```
.clock    CLK ;
.input    Branch,
          PCRelative,
          Immediate[31:0],
          Valid,
          enEUin,
          Clear,
          Config[2:0],
          ;
.output   IsShortJump,
          InvShort,
          ;

IsShortJump = Branch & Valid & enEUin & PCRelative & (Immediate[31:6] = = 0)
              & (Immediate[5:2] > = 2) & InRange & Clear;
InRange   = (Config[2:0] = = 1)  &  (Immediate[5:2] < = 2)
          #  (Config[2:0] = = 2)  &  (Immediate[5:2] < = 3)
          #  (Config[2:0] = = 3)  &  (Immediate[5:2] < = 4)
          #  (Config[2:0] = = 4)  &  (Immediate[5:2] < = 5)
          #  (Config[2:0] = = 5)  &  (Immediate[5:2] < = 6)
          #  (Config[2:0] = = 6)  &  (Immediate[5:2] < = 7)
          #  (Config[2:0] = = 7)  &  (Immediate[5:2] < = 8)
          ;
Counter(Count,ShortActive,Immediate[5:2],ShortCount[3:0]);
Count = Valid & enEUin & ShortActive;
Terminal = (ShortCount = = 2);
ShortActive :  = (IsShortJump
              #   ShortActive & !Terminal) & !Clear;
InvShort :    = (Count & !Terminal
              #   InvShort & !(Terminal & Count)) & !Clear
              ;
```

FIG. 3B

METHOD OF OPERATION AND APPARATUS FOR OPTIMIZING EXECUTION OF SHORT INSTRUCTION BRANCHES

BACKGROUND OF THE INVENTION

The present invention is related to the field of CPU (Central Processing Unit) design and operation and, more particularly, to the optimization of CPU operations in executing branch instructions with target instructions displaced a short distance away.

The CPU of a computer system fetches, decodes, and executes a sequence of instructions from a source, such as an instruction cache or main memory. Among the instructions are typically branch instructions which permit the execution of instructions to vary from the sequence. A branch instruction has a target instruction to which the CPU may jump upon execution of the branch instruction. The branch instruction may be located anywhere in the sequence of instructions.

To speed operations, most CPUs are pipelined. That is, rather than fetching, decoding and executing one instruction before moving on to the next instruction in the sequence, several instructions in the instruction sequence are processed at different stages in the CPU at one time. For example, one instruction might be at the execution stage, the next instruction in the sequence at the decoding stage, and the instruction following that instruction might be at fetching stage.

A fetching operation typically takes much time compared to the operations of fetching and execution. This time, or latency, slows the operation of the CPU because the CPU must wait for the arbitrary instruction to be fetched from the source and decoded. Hence the CPU pipeline maintains the speed of operations by calling for the fetching of an instruction some time before it is required for execution. However, upon execution of a branch instruction which instructs the CPU to jump to the target instruction, the advantage of a pipeline is lost. The CPU must halt the execution of instructions until the target instruction is fetched and decoded.

In some cases a target instruction is located only a short displacement, i.e., a small number of instructions, forward from the branch instruction. If the latency of the computer system, i.e., the time required to fetch the target instruction from memory and ready the instruction for execution, is long compared to the time required to cycle the instruction queue to the target instruction, time may be considered wasted by executing the branch instruction in a traditional fashion. The present invention solves or substantially mitigates this problem for branch instructions which have target instructions displaced only a short distance from the branch instructions.

SUMMARY OF THE INVENTION

The present invention provides for a method of operating a CPU. The method of operation includes fetching a branch instruction and its target instruction indicated by the branch instruction in a sequence of computer instructions. If the displacement between the branch instruction and its target is determined to be less than a predetermined amount, the branch instruction is canceled and the instructions between the branch instruction and the target instruction are invalidated when the displacement is less than the predetermined amount. The target instruction is executed when the CPU reaches it in the instruction sequence.

A logic block and a counter handle a control signal which invalidates the execution of instructions until the target instruction is ready for execution. At that time, the assertion of the control signal is removed.

Time is saved because the time for refetching the target instruction is avoided. The operation of the CPU in handling short forward branch instructions is optimized.

BRIEF DESCRIPTION OF THE DRAWINGS

A clearer understanding of the present invention may be achieved by a perusal of the following description of specific embodiments with reference to the following drawings:

FIG. 1A is a listing of an exemplary program having a branch instruction with a target instruction displaced a short distance from the branch instruction; FIG. 1B illustrates the timing of operation in a prior art pipelined CPU executing the FIG. 1A program;

FIG. 2 illustrates the timing of operation in a pipelined CPU executing the FIG. 1A program, according to the present invention; and FIG. 3A is a block diagram of the elements for operating a CPU according to the present invention; FIG. 3B details the elements of FIG. 3A in hardware description language.

DESCRIPTION OF PREFERRED EMBODIMENT(S)

FIG. 1A is an exemplary program which has a target instruction displaced a short distance, i.e., a small number of instructions, away from its branch instruction. Instruction A is an instruction to Compare the contents of a register R2 to zero. Instruction B is a branch instruction to Jump to location Label if the previous Compare instruction is not true. Otherwise, instruction C is executed. Instruction C is a simple instruction to Add the value 1 to the contents of the register R3. Instruction D, which follows instruction C, Subtracts the value 2 from the contents of the register R4. Label is a placeholder for the target instruction E which is executed if the branch instruction B is executed. Instruction F follows instruction E.

FIG. 1B illustrates the operation of a typical pipelined CPU with a latency of 3 clock cycles, for example, with the exemplary program of FIG. 1A. The first clock cycle illustrates the appearance of the initial instruction A at the end of an operation to fetch the instruction from memory. At the next clock cycle, the second instruction B appears at the end of a fetch operation as instruction B is decoded. At the third clock cycle, the third instruction C is fetched, as the previously fetched instruction B is decoded, and instruction A is executed. On the fourth clock cycle, the instruction D is fetched, instruction C is decoded and instruction B is executed.

However, instruction B is a branch instruction with instruction E as its target instruction. Instruction A is not true and therefore instruction B jumps forward to instruction E (which Moves the contents of register R7 to register R6). The queue of instructions in the CPU is cleared and the instruction E is fetched. The fetching operation takes three clock cycles and two more clock cycles are used before branch instruction E appears at the execution stage. Five clock cycles pass before the CPU executes an instruction. These unused clock cycles are indicated by underlined "X" instructions at the execution stage. The execution of instructions between the branch instruction and its target instruction are canceled. On the other hand, where the target instruction is a short distance away, the instruction queue might be cycled through to the target instruction. This method of operation is faster than starting over after the instruction queue is cleared.

FIG. 2 illustrates this point. In accordance with the present invention, the CPU continues its operations. The execution of instructions C and D are canceled. Only two clock cycles are wasted before the target instruction E appears at the execution stage. Compared to the CPU operation following the prior art illustrated by FIG. 1B, the present invention saves three clock cycles.

FIG. 3B illustrates the circuit elements of the CPU according to the present invention. These elements include a Config register 10, an Immediate register 11, logic block 12 and counter 13. The Config register 10 holds a value, here shown as three bits, determined by the latency of the CPU. The Immediate register 11 holds 32 bits specified by an instruction. With respect to the present invention, Immediate register 11 holds the offset value in a branch instruction to indicate the address of the branch's target instruction.

The logic block 12 also receives control signals, Branch, PCRelative, Valid, enEUin, and Clear. The Branch signal indicates that a decoded instruction is recognized as a branch instruction. The PCRelative signal indicates that the decoded instruction has an immediate value which is to be used with the contents of the program counter (PC) of the CPU. In other words, the branch instruction has an offset value to be added to the contents of the program counter to determine the location of the target instruction. Note that the PC counts by number of bytes and immediate values are indicated in bytes (eight bits). The Valid signal indicates that the instruction is recognized as being valid. The enEUin signal indicates that the instruction is ready for execution by the execution unit(s), such as the ALU (Arithmetic-Logic Unit), of the CPU. The Clear signal resets this circuit to a known inactive state.

The counter 13 is a 4-bit counter which is connected to the logic block 12 and the Immediate register 11. The block 12 receives the counter values through lines labelled Short-Count and the block 12 also transmits control signals, Count and ShortActive, to the counter 13. The counter 13 also receives four bits, bits 2 through 5, from the Immediate register 11 as input for loading. The counter 13 is also responsive to a clock signal, Clk.

The logic block 12 generates two control signals, IsShort-Jump and InvShort. The IsShortJump signal is true when the conditions to invoke the present invention are met. Once the present invention is invoked, the InvShort signal invalidates the branch instructions and all the instructions between the branch instruction and its target instruction which is displaced a "short jump" away until the target instruction is reached in the instruction queue.

FIG. 3B describes the logic block 12, the counter 13 and their operations in detail. The logic equations are in a Hardware Description Language form. The symbol, "&", indicates a logic AND operation, "#" indicates a logic OR operation, and "!" indicates a negate or NOT operation. The symbol, "==", indicates a definition and ":=" indicates a registered signal, i.e., a logic signal being fed into a D-type flip-flop.

As stated above, the IsShortJump signal is generated when the conditions exist for the invocation of the operation of the present invention. The IsShortJump signal is true when the instruction ready for execution is a branch instruction, i.e., Branch is true; the instruction is valid, i.e., Valid is true; the execution unit(s) of the CPU is ready for the instruction, enEUin true; the instruction has an immediate value for the program counter, PCRelative is true; and there are no Clear control signals, !Clear true. Additionally, the Immediate[31:6] bits of the immediate value in the branch instruction are zero, which indicates that the target instruction is not greater than eight instructions away from the branch instruction. In the present embodiment, an instruction is four bytes long and the Immediate[31:6] bits represent a value of greater than 64 bytes, or 16 instructions. Thus there is an upper bound on the displacement between the target instruction and its branch instruction. The Immediate[5:2] bits must also be equal to or greater than 2, which ensures that there is also a lower bound on the distance between the target and its branch instruction, i.e., the trivial cases of a jump back to the same instruction, i.e., zero displacement, or to the next sequential instruction, a displacement of one instruction, are avoided. Finally, an intermediate control signal, InRange, must also be true for the IsShortJump signal to be generated.

The InRange signal is used to create a programmable upper limit for the displacement of the target instruction from its branch instruction. The programming occurs with the setting of the bits in the Config register 10. The first term of the InRange equation, (Config[2:0]==1) & (Immediate[5:2]==2), is true when the immediate bits indicate that the target instruction is 8 bytes, or 2 instructions, removed from the branch instruction. The next term, (Config[2:0]==2) & (Immediate[5:2]==3), is true when the displacement is 3 instruction away. Likewise, the remaining terms are true when the immediate bits indicate that the target instruction is respectively 4, 5, 6, 7 and 8 instructions away from its branch instruction. When any of these terms is true, the InRange signal is asserted. The user of the CPU can set the bits in the Config register 10 to the particular latency of the retrieval time of securing an instruction from memory and processing the instruction for execution in the computer system.

The counter 13 is defined as receiving a Count control signal, a ShortActive control signal, the Immediate[5:2] bits and as generating the output bits, ShortCount[3:0], to the logic block 12. The counter 13 is a "count down" counter, which loads the Immediate[5:2] bits as long as the Short-Active signal is unasserted, or false. As soon as the Short-Active signal becomes true, loading is stopped and the counter 13 starts decrementing the last loaded value. The Count control signal enables the counter 13 to count down on each Clk clock cycle. The ShortActive signal is initiated by the IsShortJump signal and the asserted state of the ShortActive signal is maintained by the term, ShortActive & !Terminal. When the Terminal signal, which is defined as the output of the counter, ShortCount, reaching 2, becomes true, the end of the canceling operation is signaled. The Terminal signal is set at 2, rather than zero, for timing purposes, i.e., to remove the assertion of the InvShort signal described below when the target instruction is ready for execution.

The InvShort signal is the control signal which invalidates the instructions at the execution stage of the CPU. The InvShort signal is first asserted by the term, Count & !Terminal, by the ShortActive signal in the Count signal. The InvShort signal is maintained true by the InvShort & !(Terminal & Count) term until the Terminal condition is reached. The InvShort signal goes low two instruction cycles later.

The example of FIG. 2 illustrates the operation of the logic block 12 and counter 13. When the instruction B reaches the execution stage, the IsShortJump signal is asserted. The instruction is recognized as a valid branch instruction with an immediate value pointing to the location of its target instruction E, which is displaced 3 instructions away. The InRange signal is true to indicate that the displacement is an acceptable distance away from the branch instruction. Likewise, the Immediate[31:6] and Immediate[5:2] conditions are also satisfied.

The assertion of the IsShortJump signal causes the assertion of the ShortActive signal and through, the Count signal, the assertion of the InvShort signal. The assertion of the InvShort signal causes the invalidation of the branch instruction B, i.e., there is no jump to target instruction E. The assertion of the ShortActive signal disables the loading of the counter 13, which had received the displacement value 3 from the Immediate register 11. On the next clock cycle, the counter 13 decrements to the value 2 as instruction C reaches the execution stage. The Terminal signal is asserted because the condition, ShortCount=2, has been reached. IsShortJump is no longer true, but both ShortActive and InvShort, which are defined as registered input equations, remain true. At the rising edge of the Clk signal, the ShortActive flip-flop captures the asserted state of the ShortActive signal of the previous clock cycle. With ShortActive true, the Count signal remains true, along with the InvShort signal. This invalidates the execution of instruction C.

The counter 13 decrements once more, ShortCount=1, at the next clock cycle. Instruction D reaches the execution stage. At the rising edge of the clock signal, the ShortActive flip-flop captures the unasserted state of ShortActive signal (from the term, ShortActive & !Terminal). ShortActive becomes false, and likewise, the Count signal becomes false. However, InvShort flip-flop captures the asserted state of the InvShort signal of the previous clock cycle so that the InvShort remains asserted. The execution of instruction D is invalidated.

Finally, at the next clock cycle, the assertion of the InvShort signal is removed. This permits the execution of the target instruction E, as desired.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A method of operation in a CPU, said method comprising fetching a sequence of computer instructions from memory, said sequence including a branch instruction designating a target instruction, said target instruction having a displacement from said branch instruction;

determining whether said displacement is less than a predetermined amount;

invalidating execution of said branch instruction and invalidating instructions between said branch instruction and said target instruction when said displacement is less than said predetermined amount; and executing said target instruction;

whereby refetching of said target instruction from memory is avoided.

2. The method of claim 1 wherein said predetermined amount is programmable.

3. The method of claim 2 wherein said displacement determining step comprises storing said predetermined value in a register; and comparing an immediate value in said branch instruction, said immediate value specifying said displacement value of said target instruction from said branch instruction.

4. The method of claim 1 wherein said predetermined amount is less than nine instructions.

5. The method of claim 4 wherein said predetermined amount is at least two instructions.

6. A CPU in a computer system, said CPU executing a queue of instructions from a memory, said instruction queue including a branch instruction and its target instruction, said branch instruction having a value defining said displacement of said target instruction from said branch instruction, said CPU comprising a logic block responsive to said branch instruction, said logic block asserting a control signal if said displacement is less than a predetermined amount so that execution of said branch instruction is invalidated;

a counter connected to said logic block for counting the number of instructions between said branch instruction and said target instruction for execution, said logic block responsive to said counter asserting said control signal so that execution of said instructions between said branch instruction and said target instruction is invalidated; and whereby refetching of said target instruction from said memory is avoided.

7. The CPU of claim 6 wherein said predetermined amount is programmable.

8. The CPU of claim 7 further comprising a programmable register for holding said predetermined value; and a second register for holding said displacement value from said branch, said programmable and second registers connected to said logic block.

9. The CPU of claim 6 wherein said predetermined amount is less than nine instructions.

10. The CPU of claim 9 wherein said predetermined amount is at least two instructions.

* * * * *